(12) United States Patent
Garudadri et al.

(10) Patent No.: US 8,589,720 B2
(45) Date of Patent: Nov. 19, 2013

(54) SYNCHRONIZING TIMING MISMATCH BY DATA INSERTION

(75) Inventors: Harinath Garudadri, San Diego, CA (US); Somdeb Majumdar, San Diego, CA (US); Rouzbeh Kashef, La Jolla, CA (US); Chinnappa K. Ganapathy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 946 days.

(21) Appl. No.: 12/118,469

(22) Filed: May 9, 2008

(65) Prior Publication Data
US 2009/0259671 A1    Oct. 15, 2009

Related U.S. Application Data

(60) Provisional application No. 61/045,197, filed on Apr. 15, 2008.

(51) Int. Cl.
*G06F 1/04* (2006.01)

(52) U.S. Cl.
USPC .......................... 713/503; 713/401

(58) Field of Classification Search
USPC .................. 713/400, 401, 501, 502, 503, 600
See application file for complete search history.

(56) References Cited

U.S. PATENT DOCUMENTS

| | | | |
|---|---|---|---|
| 4,464,784 A | 8/1984 | Agnello | |
| 5,048,012 A * | 9/1991 | Gulick et al. | 370/498 |
| 5,526,353 A * | 6/1996 | Henley et al. | 370/392 |
| 5,687,169 A | 11/1997 | Fullerton | |
| 5,764,696 A | 6/1998 | Barnes et al. | |
| 5,812,051 A | 9/1998 | Fullerton | |
| 5,823,778 A * | 10/1998 | Schmitt et al. | 433/214 |
| 5,832,035 A | 11/1998 | Fullerton | |

(Continued)

FOREIGN PATENT DOCUMENTS

| | | |
|---|---|---|
| CN | 1894659 A | 1/2007 |
| CN | 101018153 A | 8/2007 |

(Continued)

OTHER PUBLICATIONS

International Search Report & Written Opinion—PCT/US2008/063474, International Search Authority—European Patent Office—Mar. 27, 2009.

(Continued)

*Primary Examiner* — Khanh Dang
(74) *Attorney, Agent, or Firm* — Paul S. Holdaway (57) ABSTRACT

The rate at which data is provided by one device and the rate at which that data is processed by another device may differ. For example, a transmitting device may transmit data according to a transmit clock while a receiving device that receives the transmitted data may process the data according to a receive clock. If there is a timing mismatch between the transmit and receive clocks, the receiving device may receive data faster or slower than it processes the data. In such a case, there may be errors relating to the processing of the received data. To address timing mismatches such as this, the receiving device may delete data from or insert data into the received data. In conjunction with these operations, the receiving device may modify the received data at or near the insertion point or the deletion point in a manner that mitigates any adverse effect the insertion or deletion may have on a resulting output signal.

34 Claims, 7 Drawing Sheets

(56) References Cited

U.S. PATENT DOCUMENTS

| | | |
|---|---|---|
| 5,907,427 A | 5/1999 | Scalora et al. |
| 5,952,956 A | 9/1999 | Fullerton |
| 5,953,695 A * | 9/1999 | Barazesh et al. ............ 704/201 |
| 5,960,031 A | 9/1999 | Fullerton et al. |
| 5,963,581 A | 10/1999 | Fullerton et al. |
| 5,969,663 A | 10/1999 | Fullerton et al. |
| 5,995,534 A | 11/1999 | Fullerton et al. |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,252,919 B1 | 6/2001 | Lin |
| 6,292,454 B1 | 9/2001 | Hu |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,373,827 B1 * | 4/2002 | Tayebi et al. ................ 370/310 |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,678,243 B2 * | 1/2004 | Sartain et al. ................ 370/229 |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,882,661 B1 * | 4/2005 | Creedon et al. ............. 370/505 |
| 6,888,840 B1 * | 5/2005 | Ramaswamy et al. ........ 370/412 |
| 6,895,034 B2 | 5/2005 | Nunally et al. |
| 6,900,732 B2 | 5/2005 | Richards |
| 6,901,069 B2 * | 5/2005 | Bastin .......................... 370/356 |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 7,650,285 B2 * | 1/2010 | Magliaro et al. ............. 704/500 |
| 2004/0234000 A1 * | 11/2004 | Page ............................. 375/259 |
| 2006/0056563 A1 * | 3/2006 | Aweya et al. ................ 375/376 |
| 2006/0222129 A1 * | 10/2006 | Hadzic et al. ................ 375/355 |

(56) References Cited

U.S. PATENT DOCUMENTS

| | | | |
|---|---|---|---|
| 2007/0172011 A1* | 7/2007 | Kumar et al. | 375/372 |
| 2007/0260771 A1* | 11/2007 | Lee et al. | 710/29 |
| 2009/0259672 A1 | 10/2009 | Garudadri et al. | |

FOREIGN PATENT DOCUMENTS

| | | |
|---|---|---|
| EP | 0921666 A2 | 6/1999 |
| EP | 1750397 A1 | 2/2007 |
| JP | 9044193 A | 2/1997 |
| JP | 2004158925 A | 6/2004 |
| JP | 2006135657 A | 5/2006 |
| WO | WO0193490 A2 | 12/2001 |
| WO | WO0232054 A2 | 4/2002 |

OTHER PUBLICATIONS

International Search Report and Written Opinion—PCT/US2008/063475, International Search Authority—European Patent Office—Mar. 30, 2009.

Taiwan Search Report—TW097117610—TIPO—Jan. 3, 2012.

* cited by examiner

SYNCHRONIZING TIMING MISMATCH BY DATA INSERTION

CLAIM OF PRIORITY UNDER 35 U.S.C. §119

This application claims the benefit of and priority to commonly owned U.S. Provisional Patent Application No. 61/045,197, filed Apr. 15, 2008, the disclosure of which is hereby incorporated by reference herein.

CROSS-REFERENCE TO RELATED APPLICATION

This application is related to concurrently filed and commonly owned U.S. patent application entitled "SYNCHRONIZING TIMING MISMATCH BY DATA DELETION," and assigned Ser. No. 12/118,583, the disclosure of which is hereby incorporated by reference herein.

BACKGROUND

1. Field

This application relates generally to data processing and more specifically, but not exclusively, to data synchronization.

2. Introduction

In a data communication system, data may be sent from one device to another device over a designated communication medium. Here, the device that sends the data (e.g., a source device) may generate the data based on a transmit clock. In some systems, the source device sends the data without sending the transmit clock signal. In such a case, the device that receives the data (e.g., a destination device) may use its own receive clock to process the received data. In cases where the receive clock and the transmit clock are not synchronized, however, there may be a timing mismatch between the rate at which the source device sends the data and the rate at which the destination device processes the received data.

A timing mismatch such as this may lead to errors in the received data. For example, the received data may be stored in a buffer at the destination device and read out of the buffer using the receive clock. If the receive clock lags (e.g., is slower than) the transmit clock, a buffer overflow condition may occur at the destination device. Conversely, if the receive clock leads (e.g., is faster than) the transmit clock, a buffer underflow condition may occur at the receiver. For certain types of data (e.g., streaming audio), data errors caused by such data over-runs or under-runs may cause distortion in an output signal (e.g., an audio signal) generated from the received data.

One technique for addressing a timing mismatch problem is making the transmit clock available to the destination device in some manner (e.g., directly or via the data stream). In this case, the destination device uses the transmit clock or a clock that is synchronized to the transmit clock to process received data. In practice, however, such a technique may be relatively complex to implement. Such a technique may be even more complex in cases where the destination device receives data from multiple sources (e.g., each of which has its own transmit clock). The complexity associated with this technique may thus make it undesirable for some applications due to, for example, a resulting increase in hardware cost and, in some cases, reduction in battery life.

Another technique for addressing such a timing mismatch involves modifying the receive buffer using dynamic time-warping. Time-warping involves modifying the size of the buffer by upsampling and downsampling the received samples to provide data at a desired data rate. However, time-warping involves spectral domain processing or autocorrelation methods in the time domain. As these processes are computationally expensive and result in additional data processing delays, time-warping may not be a practical solution for some applications.

SUMMARY

A summary relating to several sample aspects of the disclosure follows. As used herein, the term aspects may refer to one or more aspects of the disclosure.

The disclosure relates in some aspects to modifying received data to account for a timing mismatch associated with the received data. For example, transmitted data that is synchronized to a transmit clock may be may be modified at a receiver so that the received data is better synchronized to a receive clock that is used to process the received data.

The disclosure relates in some aspects to deleting data from received data to compensate for a timing mismatch associated with the received data. This technique may be used, for example, when the operating frequency of a receive clock is slower than the operating frequency of a transmit clock. Here, substitute data that is based on the deleted data may be added to the received data in place of the deleted data. The resulting data may then be converted to an output signal and provided to a designated output device (e.g., an audio speaker). By modifying the received data in this way, adverse effects of artifacts in the output signal caused by the deletion of data may be mitigated.

The disclosure relates in some aspects to inserting data into received data to compensate for a timing mismatch associated with the received data. This technique may be used, for example, when the operating frequency of a receive clock is faster than the operating frequency of a transmit clock. Here, data that is inserted into the received data at an insertion point may be based on the data in the vicinity of (e.g., adjacent to) the insertion point. The resulting data may then be converted to an output signal and provided to a designated output device (e.g., an audio speaker). By modifying the received data in this way, adverse effects of artifacts in the output signal caused by the insertion of data may be mitigated.

BRIEF DESCRIPTION OF THE DRAWINGS

These and other sample aspects of the disclosure will be described in the detailed description and the appended claims that follow, and in the accompanying drawings, wherein:

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a data processing method comprises: identifying a timing mismatch associated with a set of data; processing the set of data to provide data that is correlated with the set of data; and inserting the correlated data into the set of data to mitigate the timing mismatch. In some aspects, the set of data may comprise sigma-delta modulated samples in this case. Also, in some aspects a data processing method comprises: identifying a timing mismatch associated with a first set of data; identifying data of the first set of data to be substituted in response to the identified timing mismatch; generating a second set of data based on the identified data; and substituting the second set of data for the identified data to mitigate the timing mismatch. In this case, in some aspects the first set of data may comprise sigma-delta modulated samples.

For illustration purposes, the discussion that follows describes various components and operations of a data processing system where one device receives data from another device. For example, a source device (e.g., a device that generates data or a device that forwards data) may send data via a transmission medium (e.g., a wired, wireless, or optical medium) to a destination device (e.g., a device that processes the data to generate an output signal). It should be appreciated that the teachings herein may be applicable to various types of information processing systems where information is sent from one component to another. For example, the teachings herein may be employed in a wireless or wired communication system, a data storage system (e.g., where data is sent from a storage medium to a device that processes the data in some way), or some other apparatus that processes information.

Figure 1:
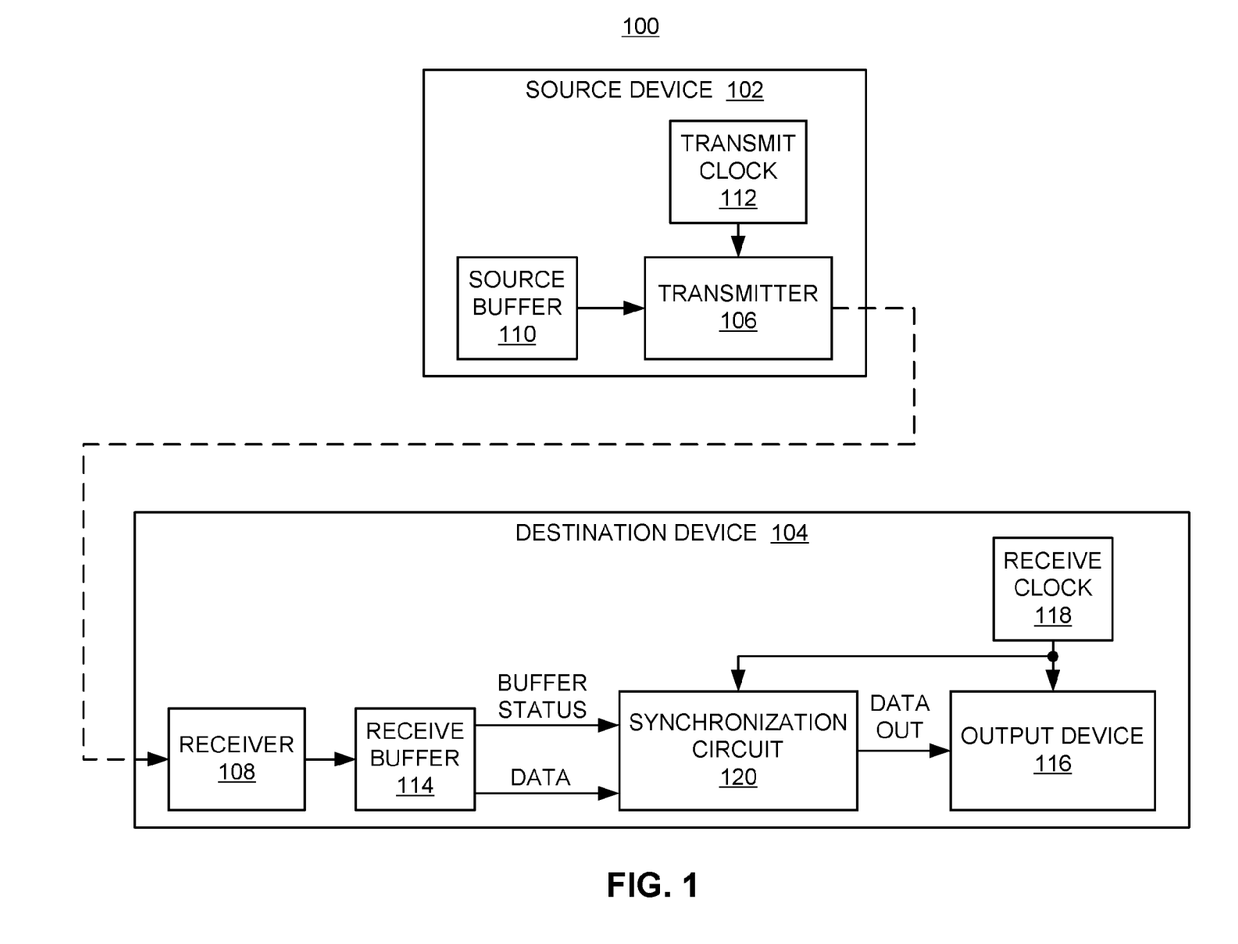
FIG. 1 is a simplified block diagram illustrating several aspects of an example of a data transmission system.

In FIG. 1, a communication system 100 includes a source device 102 that sends data to a destination device 104. For example, the source device 102 may include a transmitter 106 (e.g., a component of wireless transceiver) or some type of data driver that sends data to a receiver 108 (e.g., a component of another wireless transceiver) or some other type of data sink of the destination device 104. In some implementations, the system 100 comprises a wireless audio source (e.g., an audio player or audio receiver) that wirelessly transmits an audio data stream to one or more wireless earpieces (e.g., a wireless headset).

In some aspects the source and destination devices 102 and 104 process data based on respective clock signals. For example, the transmitter 106 (e.g., comprising an encoder) may generate source data bits (e.g., symbols) from data stored in a source buffer 110 at a rate that is based on (e.g., synchronized to) a transmit clock 112. Consequently, the receiver 108 may store data derived from its received signal in a receive buffer 114 at a rate that is based on the transmit clock 112. However, an output device 116 (e.g., comprising a decoder) of the receiver 108 may process data from the receive buffer 114 at a rate that is based on (e.g., synchronized to) a receive clock 118.

If there is a timing mismatch between the transmit and receive clocks 112 and 118, the output device 116 may process (e.g., retrieve) data from the receive buffer 114 at a rate that is faster or slower than the rate at which the data is stored in the receive buffer. As a result, buffer over-run (e.g., overflow) or buffer under-run (e.g., underflow) conditions may occasionally occur at the destination device 104. Consequently, as the output device 116 retrieves data from the receive buffer 114, at some points in time data may be dropped before it is read from the receive buffer 114 (in the case of a buffer over-run) or at some points in time the receive buffer 114 may not have any data available to be read (in the case of a buffer under-run).

In some cases, buffer over-run or under-run conditions may result in undesirable artifacts in an output signal that the output device 116 generates based on the received data or these conditions may result in a loss of communication. As an example of the former scenario, in a case where the data comprises audio data, the resulting audio signal may have distortion (e.g., commonly referred to as clicks and pops) that results from missing or extra bits in the audio stream. In particular, in low bit width (e.g., 1-bit) encoding systems, the audio quality may be particularly sensitive to mismatches between transmit and receive clocks.

To mitigate the effects of a timing mismatch that results in buffer over-run or under-run conditions, the destination device 104 includes a synchronization circuit 120 (e.g., a component of a source decoding circuit) that processes the data from the receive buffer 114 before the data is provided to the output device 116. As will be described in more detail below, the synchronization circuit 120 may insert data into or remove data from the data that is read from the receive buffer 114, as appropriate, to mitigate the timing mismatch. To determine when to insert or delete such data, information indicative of a timing mismatch associated with the received data may be provided to the synchronization circuit 120. For example, the synchronization circuit 120 may receive buffer status information (e.g., a buffer over-run or under-run indication) from the receive buffer 114.

Sample operations of the system 100 will now be described in more detail in conjunction with the flowchart of FIG. 2. For convenience, the operations of FIG. 2 (or any other operations discussed or taught herein) may be described as being performed by specific components (e.g., components described in FIGS. 1 and 3-5). It should be appreciated, however, that these operations may be performed by other types of components and may be performed using a different number of components. It also should be appreciated that one or more of the operations described herein may not be employed in a given implementation.

As represented by block 202, the destination device 104 (FIG. 1) may receive data from the source device 102 at a rate based on the transmit clock 112. The receiver 108 may thus store the data in the receive buffer 114 at this rate. As mentioned above, this data may be read out of the receive buffer 114 at a rate based on the receive clock 118.

Figure 2:
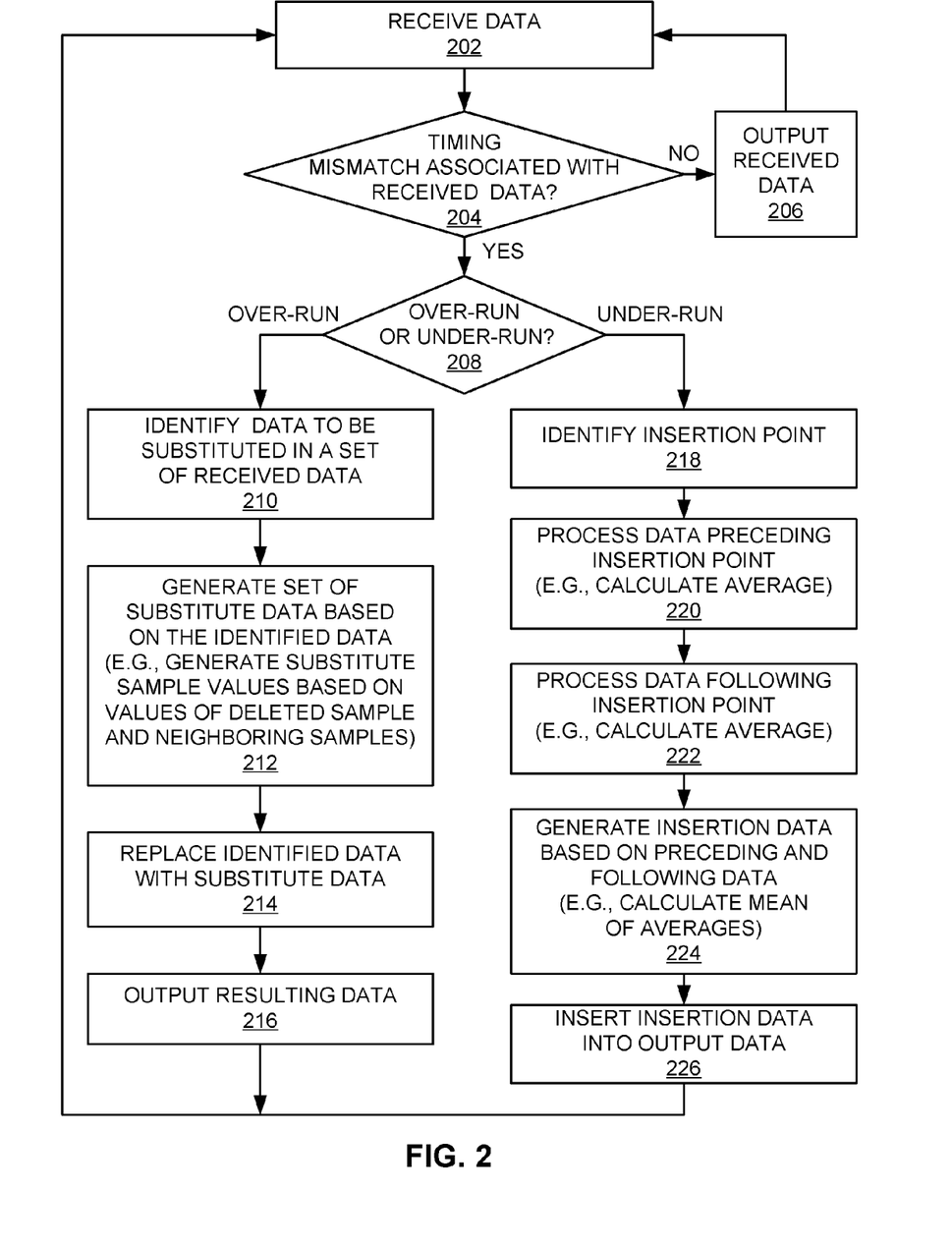
FIG. 2 is a flowchart of several aspects of an example of received data operations.

As represented by block 204 of FIG. 2, the destination device 104 determines whether there is a timing mismatch associated with the received data (e.g., the data in the receive buffer 114). As mentioned above, this timing mismatch may correspond to a timing mismatch between the transmit and receive clocks 112 and 118. To detect this timing mismatch, the synchronization circuit 120 may monitor the buffer status of the receive buffer 114 (e.g., a first-in first-out memory) to determine whether data is being written into and out of the receive buffer 114 at the same rate.

In some aspects the buffer status may comprise a buffer over-run indication that indicates that data is being written into the receive buffer 114 faster than it is being read out of the receive buffer 114. Such an indication may take various forms. In some cases the buffer over-run indication may relate to a "watermark" that indicates that the receive buffer has filled up beyond a certain level (e.g., the receive buffer 114 is more than 75% full). In some cases the buffer over-run indication may comprise a buffer-full indication.

In some aspects the buffer status may comprise a buffer under-run indication that indicates that data is being read out of the receive buffer 114 faster than it is being written into the receive buffer 114. Such an indication may take various forms. In some cases the buffer under-run indication may relate to a "watermark" that indicates that the receive buffer has been drained beyond a certain level (e.g., the receive buffer 114 is less than 25% full). In some cases the buffer under-run indication may comprise a buffer-empty indication.

As represented by block 206, if there is no timing mismatch the synchronization circuit 120 may simply output the data from the receive buffer 114 in its original form. As mentioned above, this data may be sent to an output device 116 that processes the data in a designated manner (e.g., to provide an output signal to a speaker or some other component).

As represented by block 208, if there is a timing mismatch, the synchronization circuit 120 may insert data into or delete data from the data it receive from the receive buffer 114 depending on whether there is a buffer under-run or a buffer over-run. Sample operations that may be performed in response to a buffer over-run will be described in conjunction with blocks 210-216 and a circuit 300 depicted in FIG. 3 (e.g., corresponding to the synchronization circuit 120). Sample operations that may be performed in response to a buffer under-run will be described in conjunction with blocks 218-226 and circuits 400 and 500 depicted in FIGS. 4 and 5, respectively (e.g., corresponding to the synchronization circuit 120).

In some aspects, the process of deleting data (e.g., one or more data samples) in response to a buffer over-run may involve modifying data that is adjacent to the deleted data in a manner that takes into account how the deletion may affect an associated output signal. For example, when a given sample is removed from a set of input data (e.g., the data from the receive buffer 114), the value of one or more of samples in the vicinity of a deleted sample may be adjusted based on the value of the deleted sample and the value(s) the neighboring sample(s). Thus, the deletion process may involve substituting a new set of data (e.g., corresponding to one or more modified neighboring samples) for a subset (e.g., the deleted sample and its neighboring sample(s)) of the set of input data, whereby the new substitute set of data is based on the subset. By generating the substitute data in this way, artifacts (e.g., distortion) in an output signal that is generated based on the resulting data may be mitigated.

Accordingly, as represented by block 210 of FIG. 2, this substitution process may initially involve identifying a portion of the set of input data that is to be substituted in the event a buffer over-run is indicated. This identification process may be implemented in various ways. For example, in some cases the identification of the data to be substituted may be made after receiving an indication of a buffer over-run. Conversely, in some cases a preliminary identification of data for potential substitution may be made on a more continual basis. In these latter cases, once a buffer over-run indication is received, the data currently identified for potential substitution may then be identified as the data to be substituted. An example of this latter scenario is described in more detail below in conjunction with FIG. 3.

As represented by block 212 of FIG. 2, once the data to be substituted is identified, a set of replacement data is generated based on the identified data. As a simplified example in the case of an input bit stream, a set of five bits may be identified for substitution where the middle bit is to be deleted. Thus, a replacement set of four bits is generated where the value of each bit in the replacement set may be based on the values of the five identified bits. An example of this scenario is described in more detail below in conjunction with FIG. 3.

As represented by block 214, the substitute data is then substituted into the input set of data in place of the identified data. The resulting data is then output as represented by block 216. Here, since the output data will have less data than the input data, the output data may be output at a data rate that is slower than the rate at which the input data is received. As a result, the output data rate may more effectively match the rate at which the output data is processed (e.g., which is based on a receive clock that is slower than the transmit clock in a buffer over-run scenario).

Figure 3:
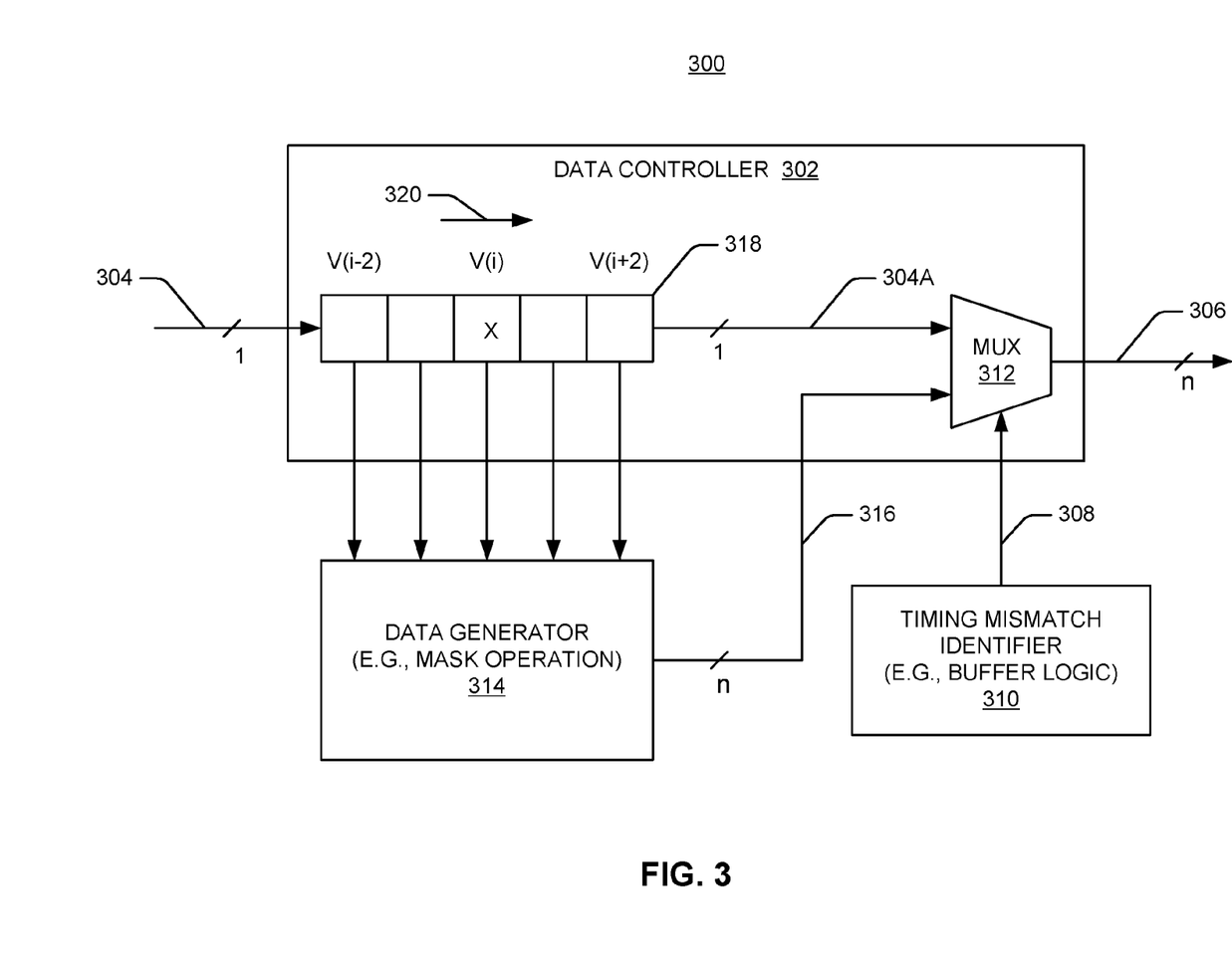
FIG. 3 is a simplified block diagram illustrating several aspects of an example of a deletion circuit.

Referring now to the example of FIG. 3, the circuit 300 includes a data controller 302 that receives input data 304 (e.g., from the receive buffer 114) and outputs output data 306 (e.g., to the output device 116). The data controller 302 also receives a buffer over-run indication 308 from a timing mismatch identifier 310 (e.g., which may take the form of logic in the receive buffer 114) whenever the identifier 310 detects a buffer over-run.

In the event a buffer over-run is not indicated, the data controller 302 outputs the input data 304 in its original form. For example, in response to the buffer over-run indication 308, a multiplexer ("MUX") 312 may use delayed input data 304A to provide the output data 306.

In the event a buffer over-run is indicated, the data controller 302 cooperates with a data generator 314 to delete data (e.g., a data sample) from the input data 304 so that the effective data rate of the output data 306 better matches the rate at which the output data 306 is processed (e.g., by the output device 116). As mentioned above, rather than simply deleting data from the input data 304, the data generator 314 modifies a set of data in the neighborhood of the data to be deleted so that the resultant substitute data 316 may be output instead of this set of data when a buffer over-run is indicated. In the circuit 300, the multiplexer 312 performs this substitution operation by outputting the substitute data 316 instead of the original delayed input data 304A. By modifying the input data 304 in this way, the circuit 300 may mitigate any artifacts that may otherwise occur in an output signal that is generated based on the output data 306.

Various techniques may be employed to generate substitute data in accordance with the teachings herein. In the example of FIG. 3, the data generator 314 generates the substitute data 316 (e.g., consisting of four data values) based on a set of five input data values. Here, the data controller 302 includes a five cell shift register 318 that shifts the input data 304 in the direction of the arrow 320. Thus, as each data value reaches the last (rightmost) cell of the shift register 318, the resulting delayed data 304A is provided to the multiplexer 312. As mentioned above, when the buffer over-run indication 308 is not activated, the multiplexer 312 may simply output the delayed data 304A as the output data 306.

The content of each cell of the shift register 318 is provided to the data generator 314 as indicated by the five downward-directed arrows. Thus, the shift register 318 may identify, on a continual basis, a set of data that may be substituted in the event a buffer over-run is indicated. Here, as each input data value is read into the first (leftmost) cell of the shift register 318, a new set of data to potentially be substituted is identified.

As represented by the X in the middle cell V(i), the data of this cell may be selected for deletion. In this case, the cell V(i) and its neighboring cells V(i−2), V(i−1), V(i+1), and V(i+2) may hold data values that the data generator 314 uses to generate substitute data 316 comprising four data values. The data generator 314 may then shift the substitute data 316 out to the multiplexer 312 at an appropriate rate (e.g., based on the receive clock 118). Then, whenever a buffer over-run indication 308 is received, the multiplexer 312 may switch its input so that the substitute data 316 is output as the output data 306.

Various algorithms may be employed to define the substitute data 316 as a function of identified data (e.g., V(i−2)−V(i+2)). For example, substitute data may be defined as a weighted combination and/or a linear combination of the identified data. In some aspects, to retain the information contained in the removed data in the remaining data, a smoothing filter may be applied over a neighborhood associated with the removed data before the data is deleted. Filter taps for the smoothing filter may be designed in a way such that appropriate (e.g., maximum) information about the deleted data is retained in its immediate neighbors.

In some cases substitute data may be defined by performing a mask operation on the identified data. A representative mask operation is set forth in Equation 1.

$$V_{mod}(i-1) = <C_1, V(i-2:i)>$$

$$V_{mod}(i+1) = <C_1, V(i+2:i)>$$

$$V_{mod}(i-2) = <C_2, V(i-2:i)>$$

$$V_{mod}(i+2) = <C_2, V(i+2:i)> \quad \text{EQUATION 1}$$

Here, $V_{mod}(i-2)$, $V_{mod}(i-1)$, $V_{mod}(i+1)$, and $V_{mod}(i+2)$ comprise the substitute data values (e.g., modified neighbor values). $C_1$ and $C_2$ are weighting factors (e.g., $C_1=\{0.25, 0.25, 0.25\}$ and $C_2=\{0.7, 0.2, 0.1\}$). The operator $<a, b>$ represents an inner-product between vectors a and b.

In some aspects, the data deletion operation may involve a change in the number of bits that represent a given data value. For example, in some cases the input data 304 comprises a stream of bits where a given bit (e.g., having a value of +1 or −1) represents a given data sample. Such an example is represented by the bus width of "1" for the input data 304 in FIG. 3. In this case, the delayed input data 304A also may comprise a one-bit wide bit stream.

The substitute data 316, on the other hand, may comprise a multi-bit stream (represented by a bus width of "n" in FIG. 3) since a given value of the substitute data 316 may be based on a combination of multiple bits and/or weights. As an example, in Equation 1, $V_{mod}(i-1)$ may be based on a combination of V(i−2), V(i−1), and V(i) which may not equate to an integer value (e.g., +1 or −1). Hence, the output of the circuit 300 may comprise multi-bit data as represented by a bus width of "n" for the output data 306 in FIG. 3. In this case, when the multiplexer 312 is outputting the delayed input data 304A, the multi-bit output data 306 may simply represent a value of +1 or −1 (or some other suitable 1-bit value).

In view of the above, any circuits (e.g., output device 116) that follow the circuit 300 may be configured to process multi-bit data. For example, the output device 116 may include a sigma-delta modulator that converts the multi-bit data into a sigma-delta modulation ("SDM") bit stream. This SDM signal may then be provided to a designated component (e.g., a speaker for providing an audio output) of the output device 116 or some other device.

The teachings herein may be used to process various types of input data. For example, in some aspects the teachings herein may be employed to process over-sampled noise-shaped samples. Here, the term over-sampling refers to sampling that exceeds the Nyquist rate. Also, in some aspects the term noise-shaping relates to techniques (e.g., filtering techniques) for spreading the energy associated with a signal of a given bandwidth (e.g., 20 kHz) over a larger bandwidth (e.g., 320 kHz) to effectively reduce the noise floor associated with the signal. SDM samples are one example of over-sampled noise-shaped samples. As an example, a data stream that may be represented by 16-bit pulse code modulation ("PCM") data at 48 kHz may be represented by a 1-bit SDM stream at approximately 1 MHz.

Referring again to FIG. 2, representative operations relating to inserting data to compensate for an under-run condition will now be described. In some aspects, the process of inserting data (e.g., one or more data samples) may involve defining the data to be inserted in a manner that takes into account how the insertion may affect an associated output signal. For example, when a given sample is inserted into a set of input data (e.g., the data in the receive buffer 114), the value of the inserted sample may be defined as a function of the value(s) of one or more sample(s) in the vicinity of (e.g., preceding and/or following) the point of insertion. As a result, the value of the inserted sample may be correlated to the value(s) of the inserted sample's neighboring sample(s). By generating the insertion data in this way, artifacts (e.g., distortion) in an output signal that is generated based on the resulting output data may be mitigated.

Figure 4:
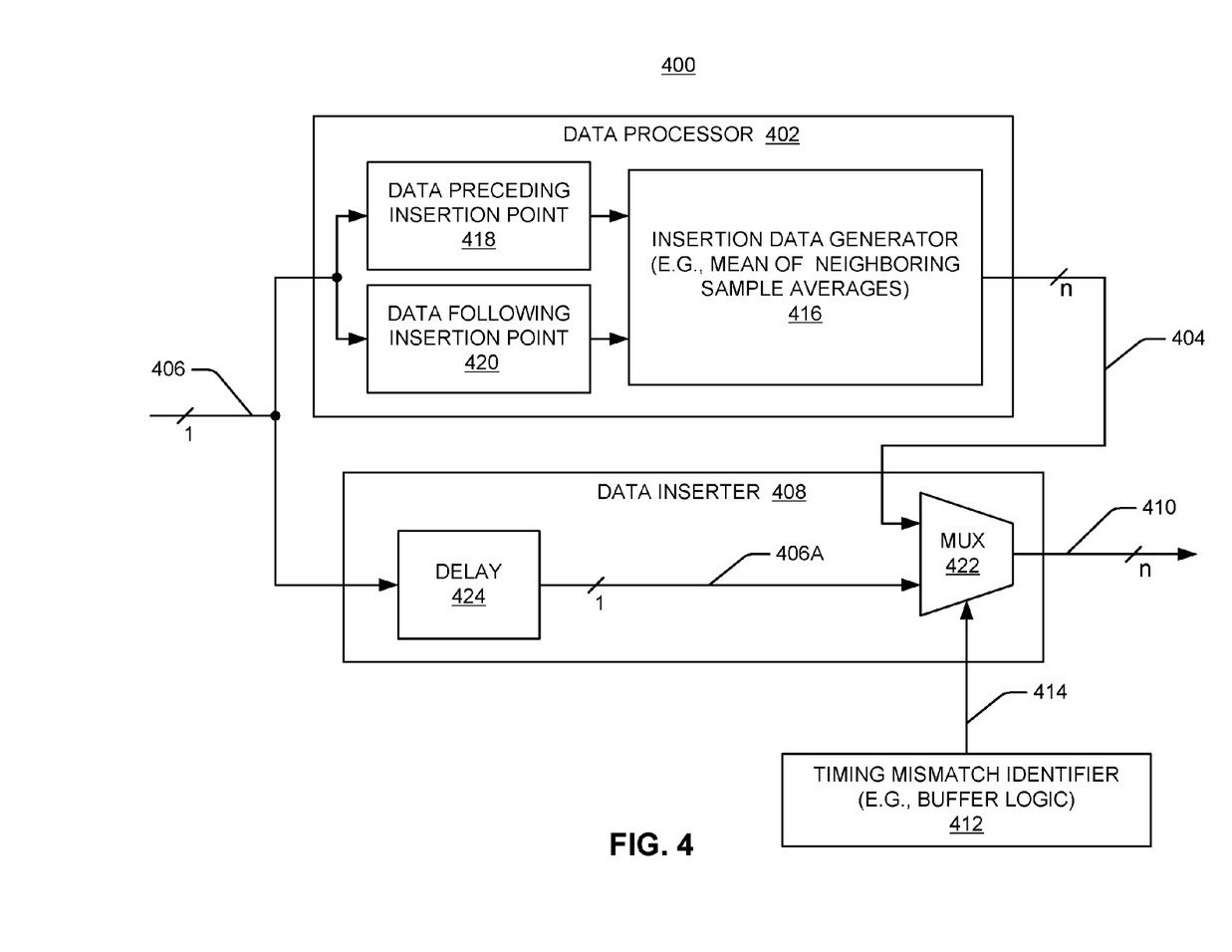
FIG. 4 is a simplified block diagram illustrating several aspects of an example of an insertion circuit.

For illustration purposes, the operations of FIG. 2 will be described in conjunction with the circuit 400 of FIG. 4. Here, a data processor 402 generates insertion data 404 (e.g., one or more data samples) by processing input data 406. A data inserter 408 inserts the insertion data 404 into the input data 406 to provide output data 410 when a timing mismatch identifier 412 provides an indication 414 of a buffer under-run.

As represented by block 218 of FIG. 2, the data insertion process may initially involve identifying an insertion point in a set of input data. This identification process may be implemented in various ways. For example, in some cases the identification of an insertion point may be made after receiving an indication of a buffer under-run. Conversely, in some case a preliminary identification of a potential insertion point may be made on a more continual basis. For example, as the data processor 402 receives each new data value (e.g., data sample) of the input data 406, the data processor 402 may identify a new insertion point in a queue through which the input data 406 passes. In such a case, once the buffer under-run indication 414 is received, the point in the input data currently identified for potential insertion may then be identified as an actual insertion point.

Blocks 220, 222, and 224 of FIG. 2 relate to generating insertion data that is correlated with a set of data in the neighborhood of the insertion point. This insertion data may be generated in various ways. For example, in some cases the data processor 402 may define the insertion data based on an average associated with the set of data. In this way, the value of the insertion data will correspond in some aspects to the values of the neighboring data.

In some cases, the insertion data may be set that a value that corresponds to a PCM equivalent (e.g., PCM approximation) associated with the input data. For example, the average of a set of consecutive samples around a given point in an over-sampled stream (e.g., an SDM stream) corresponds to a PCM value of the underlying signal at that point. In other words, the local average of the over-sampled bit stream tracks the instantaneous magnitude of the corresponding PCM data. Consequently, the PCM equivalent at that point may be defined as the mean of a set of consecutive samples (e.g., SDM samples). In a typical case, the number of samples in the set will equal the oversampling rate.

In some aspects, the insertion data may be defined based on data that precedes the insertion point, data that follows the insertion point, or both. For illustrations purposes, FIG. 4 describes an example where an insertion data generator 416 generates the insertion data 404 based on a first subset of data 418 that precedes the insertion point and a second subset of data 420 that follows the insertion point.

As represented by block 220 of FIG. 2, the data generator 416 processes the data 418 (e.g., one or more data samples) that precedes the insertion point to generate, for example, a first intermediate value that is used to define the substitute data 404. As mentioned above, this operation may involve calculating the average of a defined number of samples.

The data processor 402 may process the data 418 in various ways. For example, in some case the data processor 402 may process the data 418 in real-time (e.g., by generating a running average as data is received). In other cases, the data processor 402 may buffer the data 418 so that it may be processed at some other time (e.g., upon receipt of the buffer under-run indication 414).

As represented by block 222 of FIG. 2, the data generator 416 processes the data 420 (e.g., one or more data samples) that follows the insertion point to generate, for example, a second intermediate value that is used to define the insertion data 404. As mentioned above, this operation may involve calculating the average of a defined number of samples. As in the buffer over-run case, the data 420 may be processed in real-time or buffered for processing at some other time.

As represented by block 224 of FIG. 2, the data generator 416 generates the insertion data 404 (e.g., one or more data samples) based on the data 418 and the data 420. For example, in some cases the insertion 404 may be defined as the mean of the first and second intermediate values generated at blocks 220 and 220. That is, the value of the insertion data 404 may comprise the mean of the respective averages of the values of the preceding data 418 and the following data 420. In some aspects, the insertion data 404 may be defined as the mean of the PCM equivalent of data 418 (e.g., the PCM equivalent associated with a data sample that immediately precedes the insertion point) and the PCM equivalent of data 420 (e.g., the PCM equivalent associated with a data sample that immediately follows the insertion point). By correlating the value of the insertion data 404 with one or more neighboring values, the circuit 400 may mitigate any artifacts that may otherwise occur in an output signal that is generated based on the output data 410.

In a case where the insertion data 404 comprise multiple data (e.g., multiple data samples), each value of the insertion data 404 may be generated based on the preceding and/or following data. For example, each value for the insertion data 404 may be defined based on a linear interpolation between the first and second intermediate values (e.g., between a first and second PCM equivalent).

As represented by block 226 of FIG. 2, the data inserter 408 couples the input data 406 to its output, optionally including the insertion data 404 at the insertion point depending on whether the data inserter 408 receives the under-run indication 414. To this end, the data inserter 408 may comprise a multiplexer 422 or some other suitable circuit that outputs either the original input data 406 or the insertion data 404 as the output data 410.

A delay circuit 424 may be employed to delay the input data 406 by an amount of time that is correlated with data latency of the data processor 402. For example, the delay circuit 424 may delay the input data 406 by an appropriate amount of time such that the data preceding the insertion point (e.g., corresponding to data 418) will arrive at the multiplexer 422 as delayed input data 406A just prior to the point in time the insertion data 404 arrives at the multiplexer 422 and such that the data following the insertion point (e.g., corresponding to data 420) will arrive at the multiplexer 422 just after the arrival of the insertion data 404. Thus, the data inserter 408 may be configured to output the delayed input data 406A (e.g., corresponding to data 418) and then switch its input to output the insertion data 404. After outputting the insertion data, the multiplexer 422 then switches back to outputting the delayed input data 406A (e.g., corresponding to data 420).

As a result of providing the insertion data 404 in the output data 410, a timing mismatch associated with the input data 406 may be mitigated. For example, since there will be more output data 410 than input data 406, the output data 410 may be output at a data rate that is faster than the rate at which the input data 406 is received (e.g., which may be based on the transmit clock 112 of FIG. 1). Thus, the data rate of the output data 410 may more effectively match the rate at which the output data 410 is processed (e.g., processed by the output device 116 based on the receive clock 118 which is faster than the transmit clock 112 in the buffer under-run scenario).

As in the buffer over-run case, the data insertion operation may involve a change in the number of bits that represent a given data value. For example, in some cases the input data 406 comprises a stream of bits where a given bit (e.g., having a value of +1 or −1) represents a given data sample. Such an example is represented by the bus width of "1" for the input data 406 in FIG. 4. In this case, the delayed input data 406A also may comprise a 1-bit wide bit stream.

The insertion data 404, on the other hand, may comprise a multi-bit stream (represented by the bus width of "n" in FIG. 4) since a given value of the insertion data 404 may be based on a combination of multiple bits that may not equate to an integer value (e.g., +1 or −1). Hence, the output of the circuit 400 may comprise multi-bit data as represented by the bus width of "n" for the output data 410 in FIG. 4. In this case, when the multiplexer 422 is outputting the delayed input data 406A, the multi-bit data may simply represent a value of +1 or −1 (or some other suitable 1-bit value). Again, any circuits (e.g., output device 116) that follow the circuit 400 may be configured to process multi-bit data.

The above teachings may be used to process various types of input data. For example, in some aspects the teachings herein may be employed to process over-sampled noise-shaped samples (e.g., SDM data).

A data insertion circuit may be implemented in various ways in accordance with the teachings herein. For example, a running N-point low-pass filtered version of the receive buffer may be maintained to perform sample insertion. In some aspects, this buffer may represent the PCM equivalent of an oversampled input stream (e.g., N adjacent samples of the stream). At the location where an under-run flag is raised, a new sample that is an estimate of the N approximations (e.g., the current N-point PCM equivalent) is inserted in the original data stream. Since the modified buffer data may later pass through a low pass filter, the neighboring samples may eventually correlate well with the inserted sample.

One method to compute the PCM equivalent is to use a box-car filter, which may essentially be the average of N samples. The value is typically a function of the over sampling rate ("OSR"). In some cases N=OSR (e.g., greater than or equal to 2).

Figure 5:
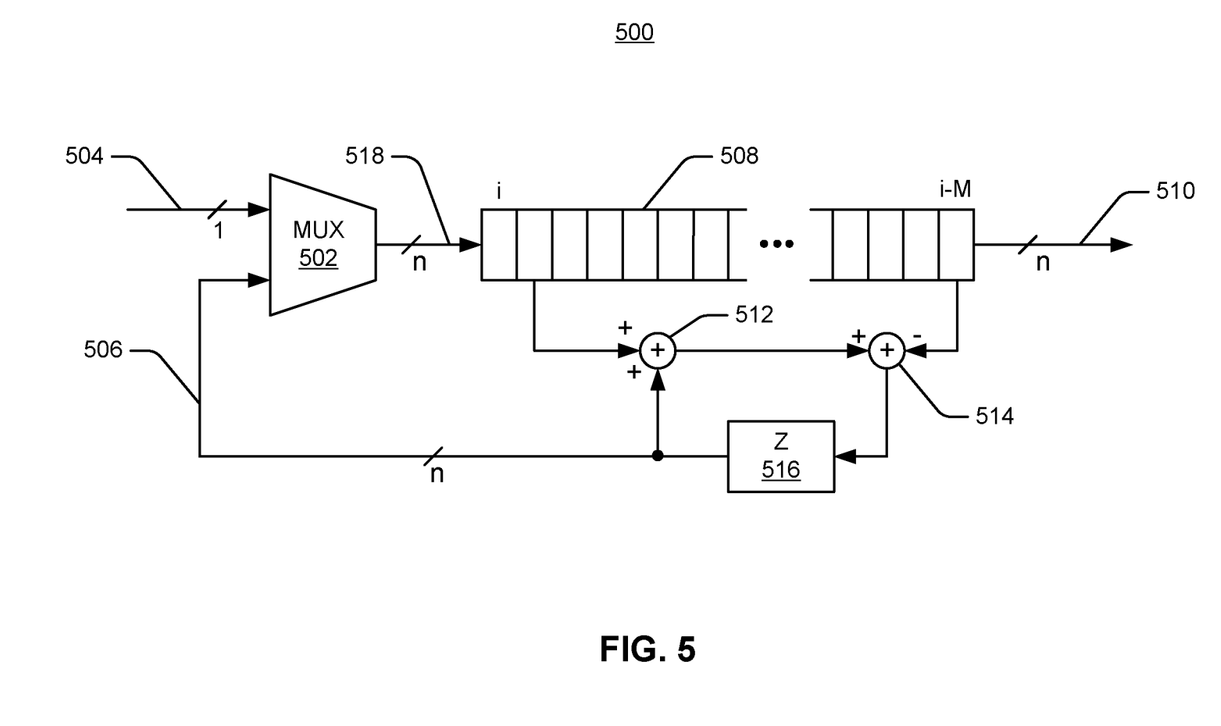
FIG. 5 is a simplified block diagram illustrating several aspects of an example of an insertion circuit.

A sample insertion circuit 500 is depicted in FIG. 5. Here, a multiplexer 502 feeds either input data 504 (e.g., a bit stream) or insertion data 506 to a shift register 508 depending on whether a buffer under-run is indicated (control input not shown in FIG. 5). The last cell of the shift register 508 then provides output data 510.

In this example, the shift register 508 has a depth of M+1. The i–$1^{th}$ bit and the i–$M^{th}$ bit are fed to a circuit comprising adder 512, adder 514, and delay 516. These components cooperate to repeatedly calculate the sum of the input data over M bits to provide the insertion data 506. Specifically, the adder 512 adds each new i–$1^{th}$ bit to the sum and the adder 514 subtracts the current i–$M^{th}$ bit from the sum.

The insertion data may then be inserted into a data stream 518 output by the multiplexer 502 instead of the input data 504 whenever there is a buffer under-run. Thus, the circuit 500 may identify, on a continual basis, a potential insertion point and the data to be inserted at that insertion point in the event a buffer under-run is indicated.

As mentioned above, in some aspects appropriate processing may be performed to normalize the values of the insertion data 506 relative to the values of the input data 504 or vice versa (e.g., by subjecting the output data 510 to a low pass filter). In this way, the insertion data 506 has the effect of an average value over the M bits rather than the sum.

Also as discussed above, the insertion data 506 (and hence the output data 510) may comprise a different number of bits than the input data 504. For example, the input data may have a bus width of "1" while the insertion data 506, the data stream 518, and the output data 510 have a bit width of "n."

In view of the above, a clock mismatch problem may be addressed from a source coding point of view. For example, in the case of a buffer under-run, a sample may be defined and inserted in receive buffer data such that it correlates well with the original samples in the receive buffer. In addition, in the case of a buffer over-run, a sample may be removed whereby the sample's neighbors are modified in a manner that results in reduced distortion in the receive output signal.

Various advantages may be realized in an apparatus constructed in accordance with the teachings here as compared to, for example, systems that address timing mismatches from a clock synchronization point of view. For example, such an apparatus may consume less power since it may use fewer and less complex components (e.g., that implement relatively simple shift and addition-related operations) to mitigate a timing mismatch. In addition, such an apparatus may have relatively low latency since the data need not be buffered for very many data cycles. Thus, in some aspects the disclosure relates to a low-power, low-latency solution to minimizing artifacts (e.g., audio artifacts) arising out of clock mismatches between a receiver and a transmitter (e.g., in wireless transmission of speech and audio). Similarly, in some aspects the disclosure relates to low complexity, low power, and low latency synchronization solutions that retain acceptable speech and audio quality.

Figure 6:
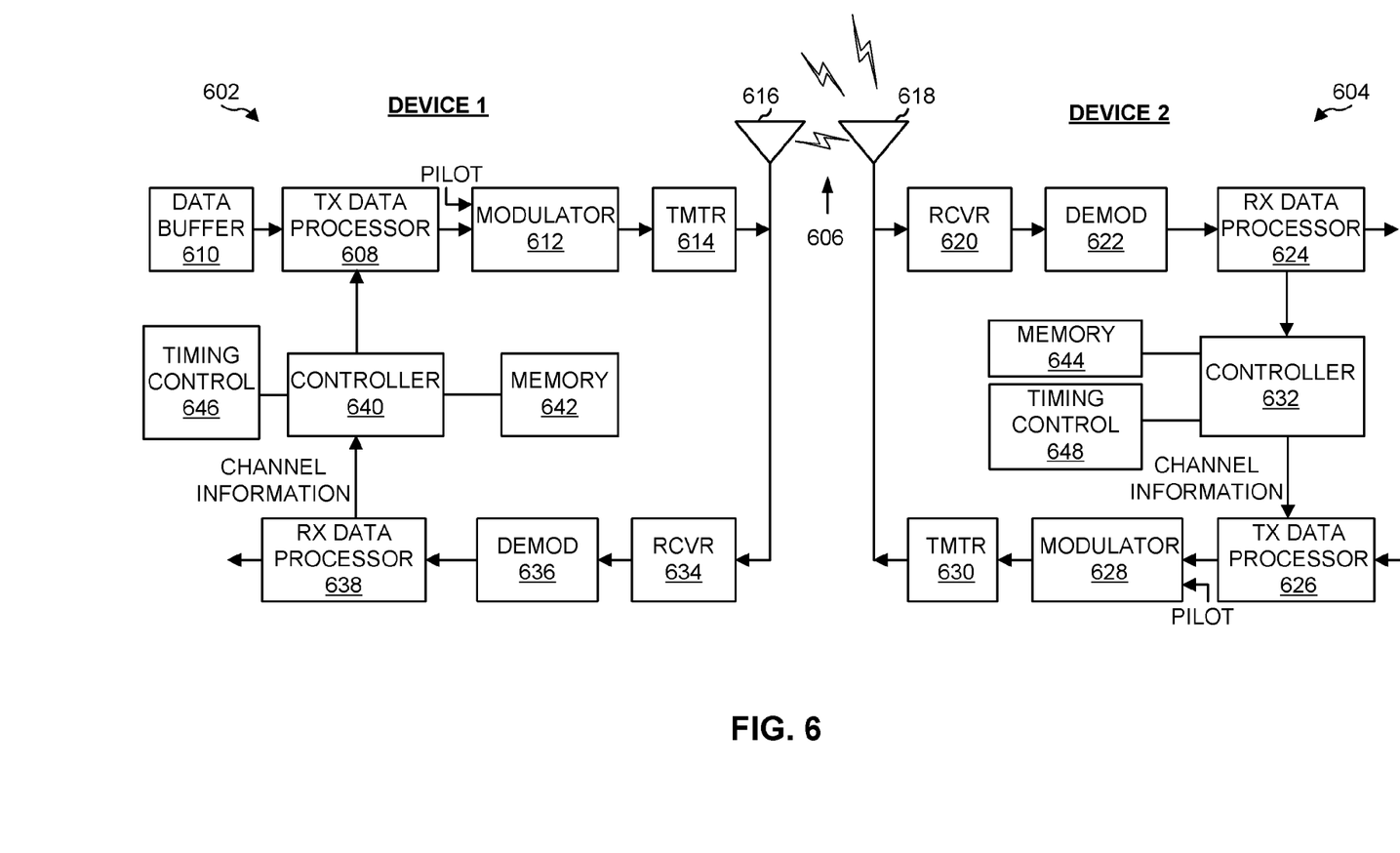
FIG. 6 is a simplified block diagram of several aspects of an example of communication components.

The teachings herein may be incorporated into a device employing various components for communicating with at least one other device. FIG. 6 depicts several sample components that may be employed to facilitate communication between devices. Here, a first device 602 and a second device 604 are adapted to communicate via a wireless communication link 606 over a suitable medium.

Initially, components involved in sending information from the device 602 to the device 604 (e.g., a reverse link) will be treated. A transmit ("TX") data processor 608 receives traffic data (e.g., data packets) from a data buffer 610 or some other suitable component. The transmit data processor 608 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 612 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 614 processes (e.g., converts to analog, filters, amplifies, and frequency upconverts) the output chip stream and generates a modulated signal, which is then transmitted from an antenna 616.

The modulated signals transmitted by the device 602 (along with signals from other devices in communication with the device 604) are received by an antenna 618 of the device 604. A receiver ("RCVR") 620 processes (e.g., conditions and digitizes) the received signal from the antenna 618 and provides received samples. A demodulator ("DEMOD") 622 processes (e.g., demodulates and detects) the received samples and provides detected data symbols, which may be a noisy estimate of the data symbols transmitted to the device 604 by the other device(s). A receive ("RX") data processor 624 processes (e.g., symbol demaps, deinterleaves, and decodes) the detected data symbols and provides decoded data associated with each transmitting device (e.g., device 602).

Components involved in sending information from the device 604 to the device 602 (e.g., a forward link) will be now be treated. At the device 604, traffic data is processed by a transmit ("TX") data processor 626 to generate data symbols. A modulator 628 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 630 and transmitted from the antenna 618. In some implementations signaling for the forward link may include power control commands and other information (e.g., relating to a communication channel) generated by a controller 632 for all devices (e.g. terminals) transmitting on the reverse link to the device 604.

At the device 602, the modulated signal transmitted by the device 604 is received by the antenna 616, conditioned and digitized by a receiver ("RCVR") 634, and processed by a demodulator ("DEMOD") 636 to obtain detected data symbols. A receive ("RX") data processor 638 processes the detected data symbols and provides decoded data for the device 602 and the forward link signaling. A controller 640 receives power control commands and other information to control data transmission and to control transmit power on the reverse link to the device 604.

The controllers 640 and 632 direct various operations of the device 602 and the device 604, respectively. For example, a controller may determine an appropriate filter, reporting information about the filter, and decode information using a filter. Data memories 642 and 644 may store program codes and data used by the controllers 640 and 632, respectively.

FIG. 6 also illustrates that the communication components may include one or more components that perform timing control operations as taught herein. For example, a timing control component 646 may cooperate with the controller 640 and/or other components of the device 602 to send/receive information to/from another device (e.g., device 604). Similarly, a timing control component 648 may cooperate with the controller 632 and/or other components of the device 604 to send/receive information to/from another device (e.g., device 602). It should be appreciated that for each device 602 and 604 the functionality of two or more of the described components may be provided by a single component. For example, a single processing component may provide functionality of the timing control component 646 and the controller 640 and a single processing component may provide functionality of the timing control component 648 and the controller 632.

A wireless device may include various components that perform functions based on signals (e.g., comprising a set of data) that are transmitted by or received at the wireless device. For example, a wireless headset may include a transducer adapted to provide an audio output based on at least a portion of the set of data. A wireless watch may include a user interface adapted to provide an indication based on at least a portion of the set of data. A wireless sensing device may include a sensor adapted to sense based on at least a portion of the set of data (e.g., based on a request included in the set of data).

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitters 614 and 630 and receivers 620 and 634) that may include various components (e.g., signal generators and signal processors) that facilitate communication over a wireless medium.

In some aspects a wireless device may communicate via an impulse-based wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless device also may be capable of transmitting and/or receiving information in a non-wireless manner (e.g., via a wired connection) via an appropriate communication interface.

Figure 7:
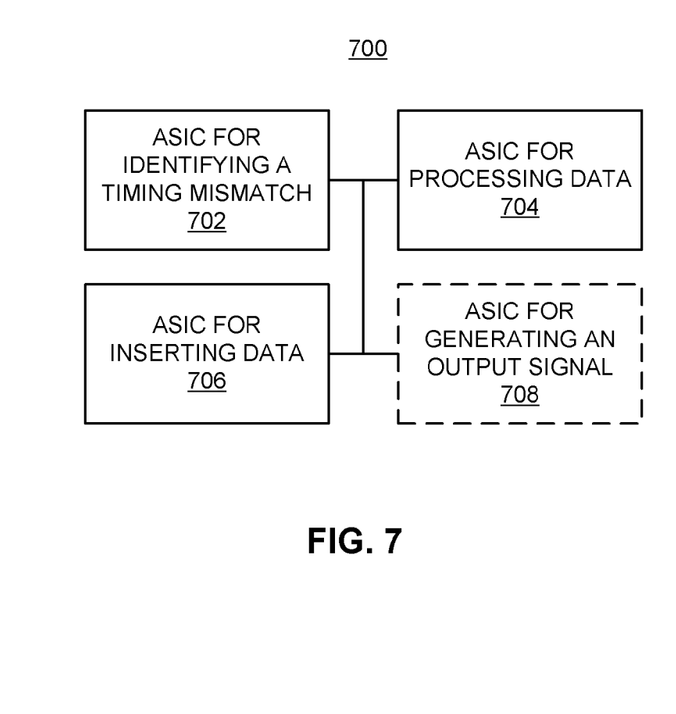
FIGS. 7 and 8 are simplified block diagrams of several sample aspects of example apparatuses configured to provide timing operations as taught herein.
Figure 8:
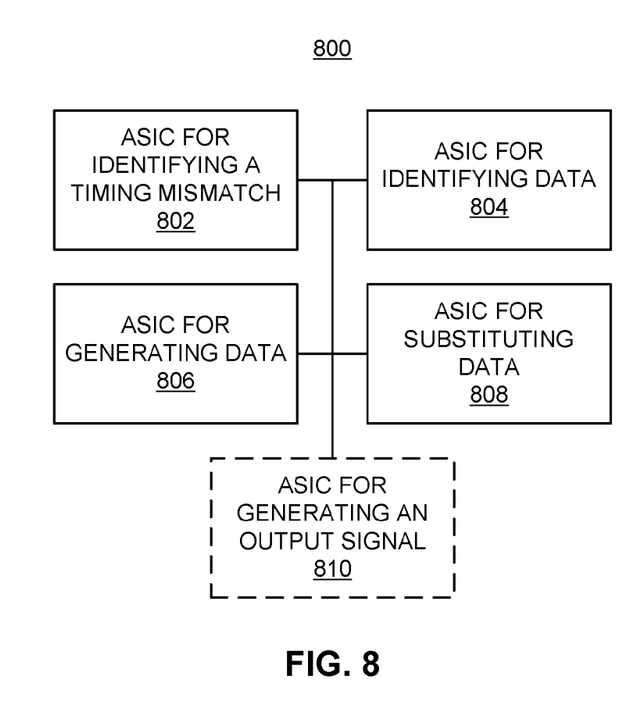

The components described herein may be implemented in a variety of ways. Referring to FIGS. 7 and 8, apparatuses 700 and 800 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatuses 700 and 800 may include one or more modules that may perform one or more of the functions described above with regard to various figures. For example, an ASIC for identifying a timing mismatch 702 or 802 may correspond to, for example, an identifier 310 or 412 as discussed herein. An ASIC for processing data 704 may correspond to, for example, a data processor 402 as discussed herein. An ASIC for inserting data 706 may correspond to, for example, a data inserter 408 as discussed herein. An ASIC for generating an output signal 708 or 810 may correspond to, for example, an output device 116 as discussed herein. An ASIC for identifying data 804 may correspond to, for example, a data controller 302 as discussed herein. An ASIC for generating data 806 may correspond to, for example, a data generator 314 as discussed herein. An ASIC for substituting data 808 may correspond to, for example, a data controller 302 as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 700 and 800 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 7 and 8 as well as other components and functions described herein, may be implemented using any suitable means. Such means also may be implemented, at least in part, using corresponding structure as taught herein. For example, the components described above in conjunction with the "ASIC for" components of FIGS. 7 and 8 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of data processing, comprising:
 identifying a timing mismatch associated with a set of data;
 identifying an insertion point within the set of data;
 generating correlated data by adding a first value of a first bit of the set of data to the correlated data to generate a first intermediate value, subtracting a second value of a second bit of the set of data that precedes the first bit to generate a second intermediate value, and delaying the second intermediate value to generate the correlated data; and inserting the correlated data into the set of data at the insertion point to mitigate the timing mismatch.

2. The method of claim 1, further comprising generating an output signal based on the set of data after insertion of the correlated data, wherein the correlation between the correlated data and the set of data mitigates distortion in the output signal that results from the insertion of the correlated data.

3. The method of claim 1, wherein the correlated data comprises at least one data sample.

4. The method of claim 1, wherein the timing mismatch relates to a buffer under-run condition.

5. The method of claim 1, further comprising:
receiving the set of data at a first rate; and
outputting the set of data after the insertion of the correlated data at a second rate, wherein the second rate is faster than the first rate.

6. The method of claim 1, further comprising:
receiving the set of data as single-bit data; and
outputting the set of data after the insertion of the correlated data as multi-bit data.

7. The method of claim 1, wherein the set of data comprises over-sampled noise-shaped samples.

8. The method of claim 1, wherein the set of data comprises sigma-delta modulated samples.

9. The method of claim 1, wherein identifying the timing mismatch comprises monitoring an amount of the set of data in a buffer.

10. The method of claim 1, wherein identifying the timing mismatch comprises determining whether an amount of the set of data in a buffer is at or below a defined threshold.

11. An apparatus for data processing, comprising:
an identifier configured to identify a timing mismatch associated with a set of data;
a data processor configured to:
identify an insertion point within the set of data; and
generate correlated data by adding a first value of a first bit of the set of data to the correlated data to generate a first intermediate value, subtracting a second value of a second bit of the set of data that precedes the first bit to generate a second intermediate value, and delaying the second intermediate value to generate the correlated data; and
a data inserter configured to insert the correlated data into the set of data at the insertion point to mitigate the timing mismatch, wherein the data inserter is coupled to the identifier and the data processor.

12. The apparatus of claim 11, further comprising an output device configured to generate an output signal based on the set of data after insertion of the correlated data, wherein the correlation between the correlated data and the set of data mitigates distortion in the output signal that results from the insertion of the correlated data, and further wherein the output device is coupled to the data inserter.

13. The apparatus of claim 11, wherein the correlated data comprises at least one data sample.

14. The apparatus of claim 11, wherein the timing mismatch relates to a buffer under-run condition.

15. The apparatus of claim 11, wherein:
the data inserter is further configured to receive the set of data at a first rate;
the data inserter is further configured to output the set of data after the insertion of the correlated data at a second rate; and
the second rate is faster than the first rate.

16. The apparatus of claim 11, wherein:
the data inserter is further configured to receive the set of data as single-bit data; and
the data inserter is further configured to output the set of data after the insertion of the correlated data as multi-bit data.

17. The apparatus of claim 11, wherein the set of data comprises over-sampled noise-shaped samples.

18. The apparatus of claim 11, wherein the set of data comprises sigma-delta modulated samples.

19. The apparatus of claim 11, wherein the identifier is configured to identify the timing mismatch by monitoring an amount of the set of data in a buffer.

20. The apparatus of claim 11, wherein the identifier is configured to identify the timing mismatch by determining whether an amount of the set of data in a buffer is at or below a defined threshold.

21. An apparatus for data processing, comprising:
means for identifying a timing mismatch associated with a set of data;
means for identifying an insertion point within the set of data;
means for generating correlated data by adding a first value of a first bit of the set of data to the correlated data to generate a first intermediate value, subtracting a second value of a second bit of the set of data that precedes the first bit to generate a second intermediate value, and delaying the second intermediate value to generate the correlated data; and
means for inserting the correlated data into the set of data at the insertion point to mitigate the timing mismatch, wherein the inserting means is coupled to the identifying means and the processing means.

22. The apparatus of claim 21, further comprising means for generating an output signal based on the set of data after insertion of the correlated data, wherein the correlation between the correlated data and the set of data mitigates distortion in the output signal that results from the insertion of the correlated data, and further wherein the output signal generating means is coupled to the inserting means.

23. The apparatus of claim 21, wherein the correlated data comprises at least one data sample.

24. The apparatus of claim 21, wherein the timing mismatch relates to a buffer under-run condition.

25. The apparatus of claim 21, wherein:
the means for inserting receives the set of data at a first rate;
the means for inserting outputs the set of data after the insertion of the correlated data at a second rate; and
the second rate is faster than the first rate.

26. The apparatus of claim 21, wherein:
the means for inserting receives the set of data as single-bit data; and
the means for inserting outputs the set of data after the insertion of the correlated data as multi-bit data.

27. The apparatus of claim 21, wherein the set of data comprises over-sampled noise-shaped samples.

28. The apparatus of claim 21, wherein the set of data comprises sigma-delta modulated samples.

29. The apparatus of claim 21, wherein the means for identifying the timing mismatch comprises means for monitoring an amount of the set of data in a buffer.

30. The apparatus of claim 21, wherein the means for identifying the timing mismatch comprises means for determining whether an amount of the set of data in a buffer is at or below a defined threshold.

31. A computer-program product for data processing, comprising:
  a non-transitory computer-readable storage device comprising codes executable by a computing apparatus to:
    identify a timing mismatch associated with a set of data;
    identify an insertion point within the set of data;
    generate correlated data by adding a first value of a first bit of the set of data to the correlated data to generate a first intermediate value, subtracting a second value of a second bit of the set of data that precedes the first bit to generate a second intermediate value, and delaying the second intermediate value to generate the correlated data; and
    inserting the correlated data into the set of data at the insertion point to mitigate the timing mismatch.

32. A headset, comprising:
  an identifier configured to identify a timing mismatch associated with a set of data;
  a data processor configured to:
    identify an insertion point within the set of data; and
    generate correlated data by adding a first value of a first bit of the set of data to the correlated data to generate a first intermediate value, subtracting a second value of a second bit of the set of data that precedes the first bit to generate a second intermediate value, and delaying the second intermediate value to generate the correlated data;
  a data inserter configured to insert the correlated data into the set of data at the insertion point to mitigate the timing mismatch, wherein the data inserter is coupled to the identifier and the data processor; and
  a transducer configured to provide an audio output based on the set of data after the insertion of the correlated data, wherein the transducer is coupled to the data inserter.

33. A watch, comprising:
  an identifier configured to identify a timing mismatch associated with a set of data;
  a data processor configured to:
    identify an insertion point within the set of data; and
    generate correlated data by adding a first value of a first bit of the set of data to the correlated data to generate a first intermediate value, subtracting a second value of a second bit of the set of data that precedes the first bit to generate a second intermediate value, and delaying the second intermediate value to generate the correlated data;
  a data inserter configured to insert the correlated data into the set of data at the insertion point to mitigate the timing mismatch, wherein the data inserter is coupled to the identifier and the data processor; and
  a user interface configured to provide an indication based on the set of data after the insertion of the correlated data, wherein the user interface is coupled to the data inserter.

34. A sensing device, comprising:
  an identifier configured to identify a timing mismatch associated with a set of data;
  a data processor configured to:
    identify an insertion point within the set of data; and
    generate correlated data by adding a first value of a first bit of the set of data to the correlated data to generate a first intermediate value, subtracting a second value of a second bit of the set of data that precedes the first bit to generate a second intermediate value, and delaying the second intermediate value to generate the correlated data;
  a data inserter configured to insert the correlated data into the set of data at the insertion point to mitigate the timing mismatch, wherein the data inserter is coupled to the identifier and the data processor; and
  a sensor configured to sense based on the set of data after the insertion of the correlated data, wherein the sensor is coupled to the data inserter.

* * * * *